US010579687B2

(12) United States Patent
Lim et al.

(10) Patent No.: US 10,579,687 B2
(45) Date of Patent: Mar. 3, 2020

(54) PROVIDING NATIVE APPLICATION SEARCH RESULTS WITH WEB SEARCH RESULTS

(71) Applicant: Google Inc., Mountain View, CA (US)

(72) Inventors: Geunhwi Lim, SungNam (KR); Dong Ha Lee, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 894 days.

(21) Appl. No.: 14/842,701

(22) Filed: Sep. 1, 2015

(65) Prior Publication Data

US 2017/0061017 A1    Mar. 2, 2017

(51) Int. Cl.
| | |
|---|---|
| *G06F 17/30* | (2006.01) |
| *G06F 16/9535* | (2019.01) |
| *G06F 3/0484* | (2013.01) |
| *G06F 3/0482* | (2013.01) |
| *G06F 16/248* | (2019.01) |
| *G06F 16/957* | (2019.01) |

(Continued)

(52) U.S. Cl.
CPC ........ *G06F 16/9535* (2019.01); *G06F 3/0482* (2013.01); *G06F 3/04842* (2013.01); *G06F 16/248* (2019.01); *G06F 16/24578* (2019.01); *G06F 16/951* (2019.01); *G06F 16/957* (2019.01)

(58) Field of Classification Search
USPC ........ 707/607, 609, 687, 705, 790, 813, 821
See application file for complete search history.

(56) References Cited

U.S. PATENT DOCUMENTS

| | | | |
|---|---|---|---|
| 7,617,225 B2* | 11/2009 | Arrouye | ............ G06F 17/30067 |
| 8,086,957 B2* | 12/2011 | Bauchot | ............ G06F 17/30896 |
| | | | 715/234 |

(Continued)

FOREIGN PATENT DOCUMENTS

| | | |
|---|---|---|
| JP | 2015-005196 | 1/2015 |
| WO | 2015/034767 | 3/2015 |

OTHER PUBLICATIONS

International Search Report and Written Opinion in International Application No. PCT/US2016/049683, dated Nov. 15, 2016, 11 pages.

(Continued)

*Primary Examiner* — Sana A Al-Hashemi
(74) *Attorney, Agent, or Firm* — Fish & Richardson P.C.

(57) ABSTRACT

Methods, systems, and apparatus, including computer programs encoded on computer storage media, for receiving a plurality of web search results, the plurality of web search results generated from a web corpus; including an interface element in the plurality of web search results, the interface element specifying a particular native application and configured to, when selected at the user device, cause a plurality of native application search results responsive to the search query be provided to the user device, each native application search result deeplinking to the particular native application; providing the interface element and the plurality of web search results to the user device; receiving an indication of a selection of the interface element from the user device; and in response to receiving the indication, providing the plurality of native application search results for the particular native application to the user device.

7 Claims, 4 Drawing Sheets

(51) Int. Cl.
    *G06F 16/2457*     (2019.01)
    *G06F 16/951*     (2019.01)

(56) References Cited

U.S. PATENT DOCUMENTS

| | | | |
|---|---|---|---|
| 8,510,764 B1* | 8/2013 | Deselaers | G06F 9/485 |
| | | | 719/329 |
| 8,996,520 B2 | 3/2015 | Chang et al. | |
| 9,262,489 B2* | 2/2016 | Tanner | G06F 16/248 |
| 9,652,508 B1* | 5/2017 | Imaizumi | G06F 17/3053 |
| 2013/0110815 A1 | 5/2013 | Tankovich et al. | |
| 2014/0172840 A1 | 6/2014 | Kumar et al. | |
| 2014/0222833 A1* | 8/2014 | Jia | G06Q 30/02 |
| | | | 707/748 |
| 2014/0250106 A1 | 9/2014 | Shapira et al. | |
| 2014/0278754 A1* | 9/2014 | Cronin | G06F 17/30539 |
| | | | 705/7.29 |
| 2014/0316890 A1 | 10/2014 | Kagan | |
| 2014/0359598 A1 | 12/2014 | Oliver et al. | |
| 2014/0365462 A1 | 12/2014 | Chang | |
| 2015/0066886 A1 | 3/2015 | Wu et al. | |

OTHER PUBLICATIONS

KR Office Action in Korean Application No. 10-2017-7031392, dated Apr. 30, 2019, 12 pages (with English translation).

\* cited by examiner

FIG. 4

PROVIDING NATIVE APPLICATION SEARCH RESULTS WITH WEB SEARCH RESULTS

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. Search engines crawl and index these resources to facilitate searching of the resources.

Furthermore, with the advent of tablet computers and smart phones, native applications that facilitate the performance of the same functions facilitated by the use of web page resources are now being provided in large numbers. Additionally, native applications that do not have corresponding websites with similar content, such as games, are also very popular on tablet computers and smart phones. Accordingly, search engines now also facilitate searching of these native applications.

One process by which search engines gather information for native applications is by accessing "deeplinks" for native applications. A deeplink is an instruction specifying a particular environment instance of a native application and configured to cause the native application to instantiate the environment instance of the specified native application when selected at a user device. The native application generates the environment instance for display within the native application on a user device. For example, a deeplink may be a URI that specifies a particular native application, resource content that the native application is to access, and a particular user interface that should be instantiated when the native application is launched by use of the deeplink. For example, a deeplink may specify a selection menu for a game environment; or a particular selection of a song for a music application; or a particular recipe for a cooking application; and the like.

Search engines now also facilitate searching of these native applications. A user's informational need may thus be satisfied by search engines providing search results that identify either one (or both) of a particular web page resource that describes a native application, and search results for the native application itself.

SUMMARY

In general, this specification describes a system for providing native application search results with web search results.

In general, one innovative aspect of the subject matter described in this specification can be embodied in methods that includes the actions of receiving a plurality of web search results responsive to a search query submitted at a user device, the plurality of web search results generated from a web corpus; including an interface element in the plurality of web search results, the interface element specifying a particular native application and configured to, when selected at the user device, cause a plurality of native application search results responsive to the search query be provided to the user device, each native application search result deeplinking to the particular native application; providing the interface element and the plurality of web search results to the user device; receiving an indication of a selection of the interface element from the user device; and in response to receiving the indication, providing the plurality of native application search results for the particular native application to the user device.

Particular embodiments of the subject matter described in this specification can be implemented so as to realize one or more of the following advantages. Native application search results can sometimes be more relevant than web search results. In response to a search query from a user, the system can respond with search results including both native application and web search results. The user can select a native application search result to access content directly from a native application installed on a device of the user, thereby providing the user with additional relevant search results and a better user experience.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system determines when to search a native application corpus for native applications and insert native application search results into a set of general web search results in response to receiving a query. The search can optionally be based on a search probability ratio or relevance scores for native application search results. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

If a search is triggered to include native application search results and web search results, the corpus is searched for native applications and the native applications are scored. A variety of scoring signals can be used, including indexed content of native applications, user ratings of the native applications, the query popularity for queries received for searches of the application corpus, etc. Native applications, once scored in response to the query, are ranked, and one or more native application search results may be provided to the user device in response to the query.

Whether a native application search result is provided, and if provided, the position of the native application search result relative to other search results, is determined based on filtering criteria and ranking criteria. The filtering criteria and ranking criteria may include the ranking of a corresponding resource that describes the native application relative to other resources, the scores of the native applications, and other factors.

These features and other features are described in more detail below.

Figure 1:
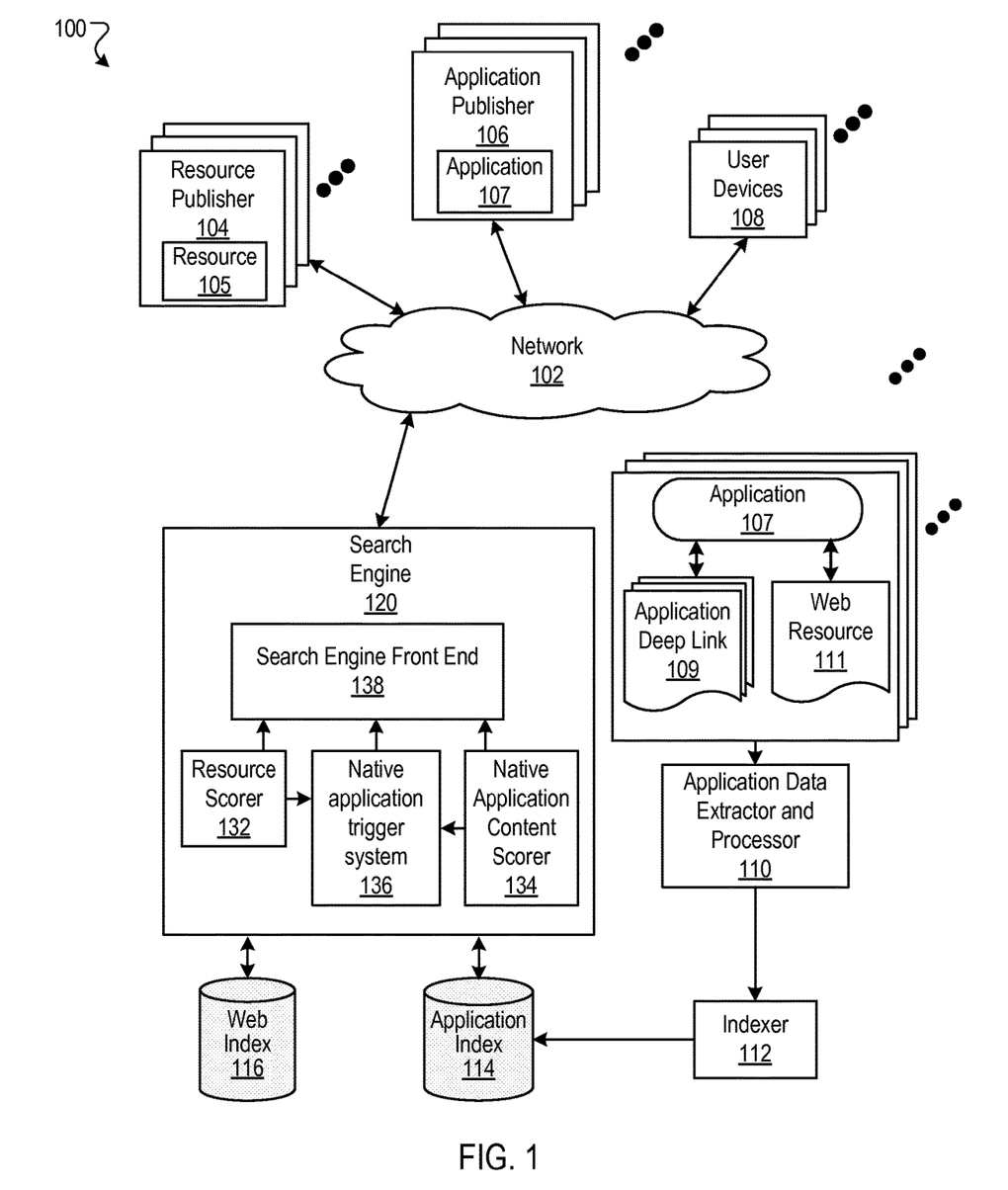
FIG. 1 is a block diagram of an example environment 100 in which triggering the search of and the ranking of native applications occurs.

FIG. 1 is a block diagram of an example environment 100 in which triggering the search of and the ranking of native applications occurs. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 116 and an application index 114. The web index 116 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 116 and, optionally, the application index 114 to identify resources and applications, respectively, that are relevant to the query. Generally, a first type of search operation implementing a first search algorithm is used to search the index 116, and a second type of search operation implementing a second, different algorithm is used to search the application index 114. The search engine 120 implements a resource scorer 132 process to score web resources, and a native application content scorer 134 process to score content within native applications. A variety of appropriate search engine algorithms can be used to implement the resource scorer 132 and the native application content scorer 134.

The search engine 120 utilizes a native application trigger system 136 to determine whether to search the native application index 114 and provide a native application search result to a user device. The native application trigger system 136 is described in more detail with reference to FIG. 2 below. The search engine 120 utilizes a search engine front end 138, such as a web server, arrange and provide the search results to the user device 108 from which the query was received.

A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114. A native application search result may include a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot. Alternatively, a native application search result may include a "purchase" (or "install") command that, when selected, results in a purchase (or free download) and installation of the native application on a user device.

Publishers 106 that provide native applications 107 also provide the deep links 109 to the search engine 120. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

For many native applications 107, there also exist web resources 111 that are descriptive of the native applications 107. One example of such a resource 111 is a product page in an on-line native application store. The product page can be browsed using a web browser, and can be indexed in the web index 116. The web resource 111 may include screen shots of the native application, descriptions of user ratings, and the like. Typically the web resource 111 is a web page specific to the native application, and is used to facilitate a purchase and/or download of the native application.

In certain situations, depending on the search query and the corresponding web based search result, the search engine 120 may include in a set of web page search results a native application search result. The native application search result may be, for example, inserted at a position relative to a product web page search result for the native application, or, alternatively, may entirely replace the product web page search result.

Figure 2:
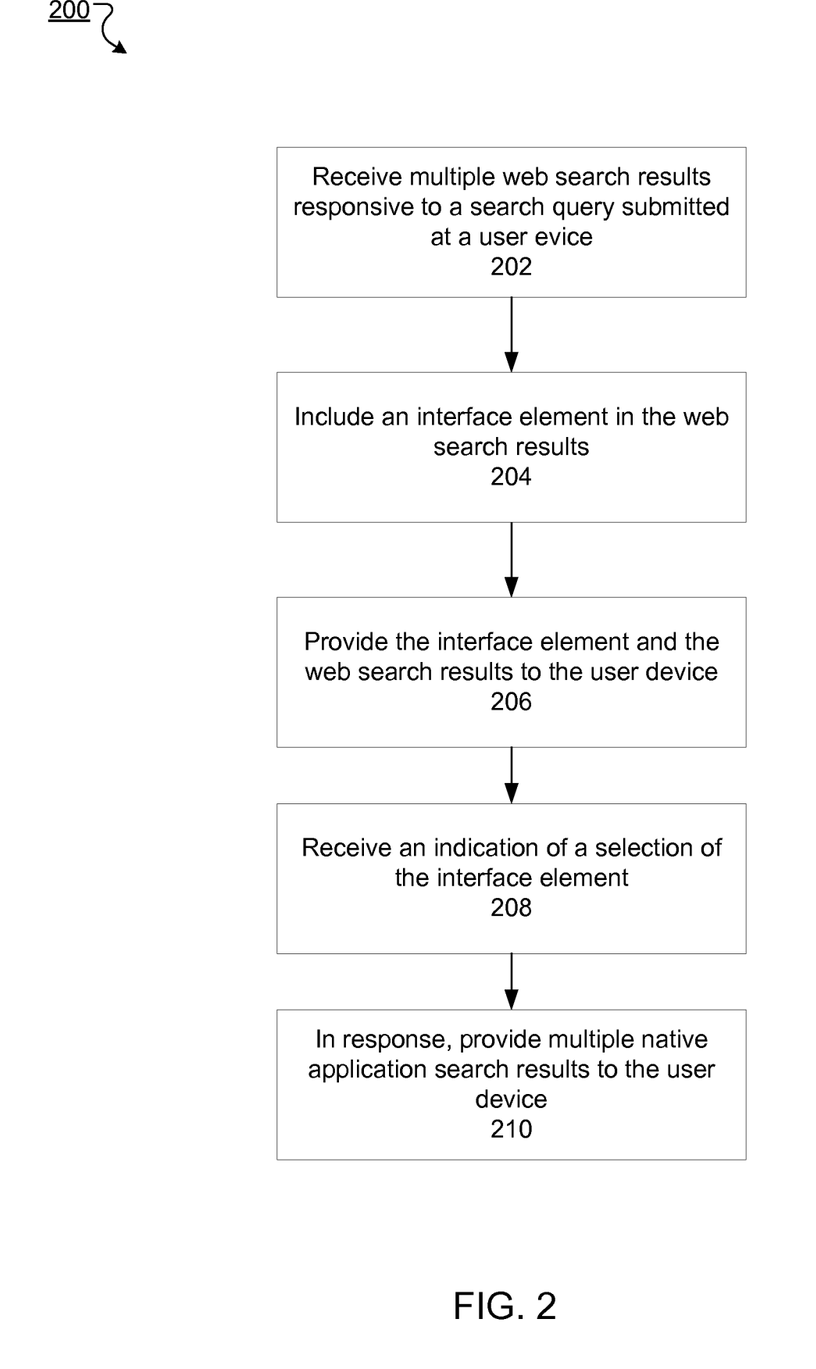
FIG. 2 is a flow diagram of an example method for providing native application search results with web search results.

FIG. 2 is a flow diagram 200 of an example method for providing native application search results with web search results. For convenience, the method 200 will be described with respect to a system, e.g., the native application trigger system 136 of FIG. 1, having one or more computing devices that execute software to implement the method 200.

The system receives multiple web search results responsive to a search query submitted at a user device (step 202). In response to receiving a search query, a search engine can generate the web search results from a web corpus, e.g., the web index 116 of FIG. 1. The search engine can provide the web search results to the system.

The system includes an interface element in the web search results (step 204). The system can generate the interface element to specify a particular native application that is relevant to the search query. The interface element can also be configured to, when selected at the user device, cause the search engine to generate multiple native application search results responsive to the search query. Each native application search result can be a different deeplink to the particular native application. This will be described further below with reference to FIG. 3.

Before the system includes the interface element specifying the particular native application, the system can determine that the particular native application is installed at the user device. A user of the user device can have a user account that is logged into the system or the search engine utilizing the system. The user account can be associated with a profile of installed native applications on the user device. The system can access the profile to determine whether the particular native application is installed.

The system can then retrieve or generate multiple native application search results deeplinking to the particular native application that are responsive to the search query. The search engine can generate the native application search results from an application corpus, e.g., the application index 114 of FIG. 1. Each native application search result also has a respective relevance score, as described above with reference to FIG. 1.

In some implementations, the system includes the interface element based on relevance scores of native application search results responsive to the search query. The system can determine that at least a threshold number of the native application search results for a particular native application have a threshold relevance score to the search query. The threshold number and the threshold relevance score can be predetermined by the system.

In response to determining that the threshold number have the threshold relevance score, the system can include the interface element. If there is not the threshold number of native application search results having the threshold relevance score, the system can provide only the web search results and not any native application search results to the user device.

In some implementations, the system includes the interface element based on a search probability ratio. The search probability ratio is a measure of a likelihood of the search query being submitted for an application corpus, e.g., derived from an application index, compared to the web corpus, e.g., derived from a web index.

Other types of search probability ratios can also be used. For example, the search probability ratio can be the likelihood of a query being issued for a search of a particular corpus. For example, in the context of native application, the search probability ratio is a likelihood that the query is being issued for a search of native applications given a total number of instances of the query for the web corpus. Alternatively, the search probability ratio for a particular corpus can be the ratio of the number of instances for the particular corpus to the total number of instances for several corpora combined.

The data to determine a search probability ratio can be gathered in a variety of ways. In some implementations, search engines that provide for the ability to search particular corpora, such as a web corpus, an image corpus, a native application corpus, and the like, can track, for each query, the number of instances that each query is submitted for each corpus.

In other implementations for native applications in particular, a search engine may have access to query logs for on-line stores that offer native applications. The number of instances of the query can be compared to the number of instance of the query submitted for a search of one or more other corpora to determine the search probability ratio for the native application.

In implementations in which the search probability ratio is used, to determine whether to include the interface element, the system can determine that the search query has a threshold search probability ratio for the particular native application. The threshold search probability ratio can be predetermined by the system.

In response to determining that the threshold search probability ratio is satisfied, the system can include the interface element. Similar to above, if the threshold search probability ratio is not satisfied, the system can provide only the web search results and not any native application search results to the user device.

The system provides the interface element and the web search results to the user device (step 206) in response to the search query. The response can be sent to the user device through a network, e.g., the Internet. In some implementations, the system also provides one or more native application search results, e.g., a most highly scored native application search result. In this implementation, the interface element can be included as an additional link in the provided native application search results for the particular native application. This will be described further below with reference to FIG. 4.

The user device can receive a selection of the interface element. For example, a user can click or tap on the interface element. The user device sends an indication of a selection of the interface element to the system, and the system processes the indication of the selection of the interface element (step 208).

In response to receiving the indication, the system provides multiple native application search results to the user (step 210). In some implementations, the native application search results each correspond to a particular native application, but each has a different deep link. In other implementations, native application search results for two or more native applications can be provided. The system can generate or be provided with the native application search results responsive to the search query. The system can then send the multiple native application search results to the user device.

Each native application search result, when selected at the user device, specifies a particular environment instance of the native application. That is, selecting the native application search result causes the native application to instantiate an instance of the specified native application in which content referenced in the native application search result is displayed.

Figure 3:
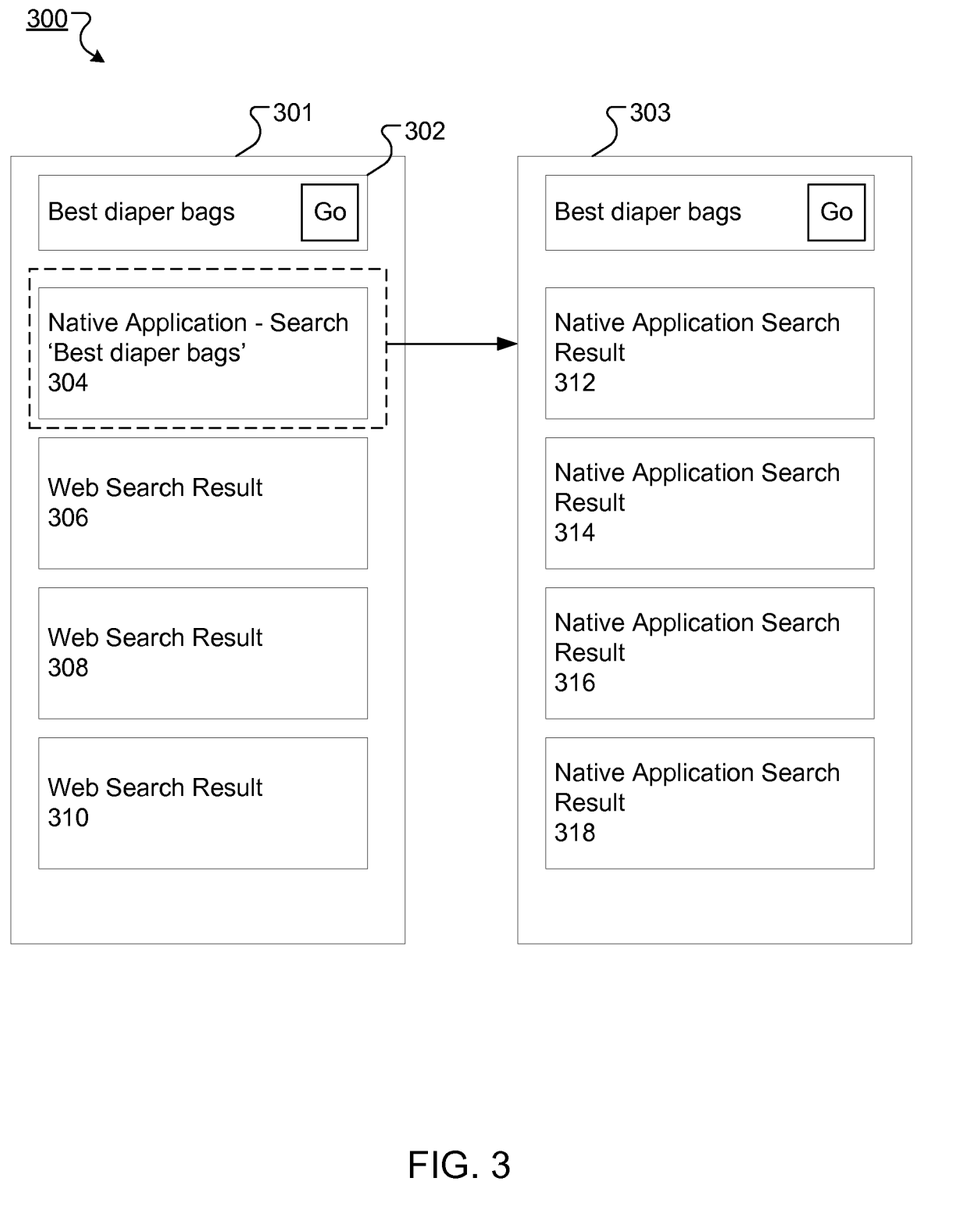
FIG. 3 is a first illustration of providing native application search results with web search results.

FIG. 3 is a first illustration 300 of providing native application search results with web search results. The search results can be provided at a browser application of a user device.

The browser application displays a view 301 of search results 306-310 provided in response to a search query 302 by a search engine. The search engine can include an interface element 304, as described above with reference to FIG. 2.

The interface element 304 can display a title of a native application to which it deeplinks. The search engine can determine a position of the interface element 304 within the search results 304-310, e.g., manually or based on web and application search result relevance scores.

When selected, the interface element 304 does not instantiate the native application but causes a new view 303 to be displayed in the browser application. That is, the user device can receive the selection and provide the selection to the search engine. The search engine can receive an indication of the selection and provide native application search results 312-318 to the new view 303 at the user device. Each native application search result is a deeplink to the native application as described above.

In some implementations, when selected, the interface element 304 is a deeplink to the native application that causes the native application to instantiate an instance of the specified native application with the search query 302 as a parameter. The search query 302 can be passed to the native application, e.g., via an Application Program Interface (API), or as a command line parameter. The native application can submit the search query 302 to a backend search system and provide search results responsive to the search query 302 within an environment of the native application.

In some implementations, the search engine modifies the search query 302 to a more specific query 320 identifying the native application. The specific query 320 limits search results responsive to the query 320 to be only native application search results for the native application and not web search results. By way of illustration, an operator "inapp:" can cause the limitation to occur.

In some other implementations, the more specific query 320 restricts search results responsive to the query 320 to be only native application search results for a group of native applications. For example, the search engine can modify the search query to "inapp:fancy.bag.app,beautiful.bag.app" or "inapp:installed" to restrict native application search results to reference the "fancy.bag.app" and "beautiful.bag.app" native applications, or all installed native applications on the user device, respectively.

Figure 4:
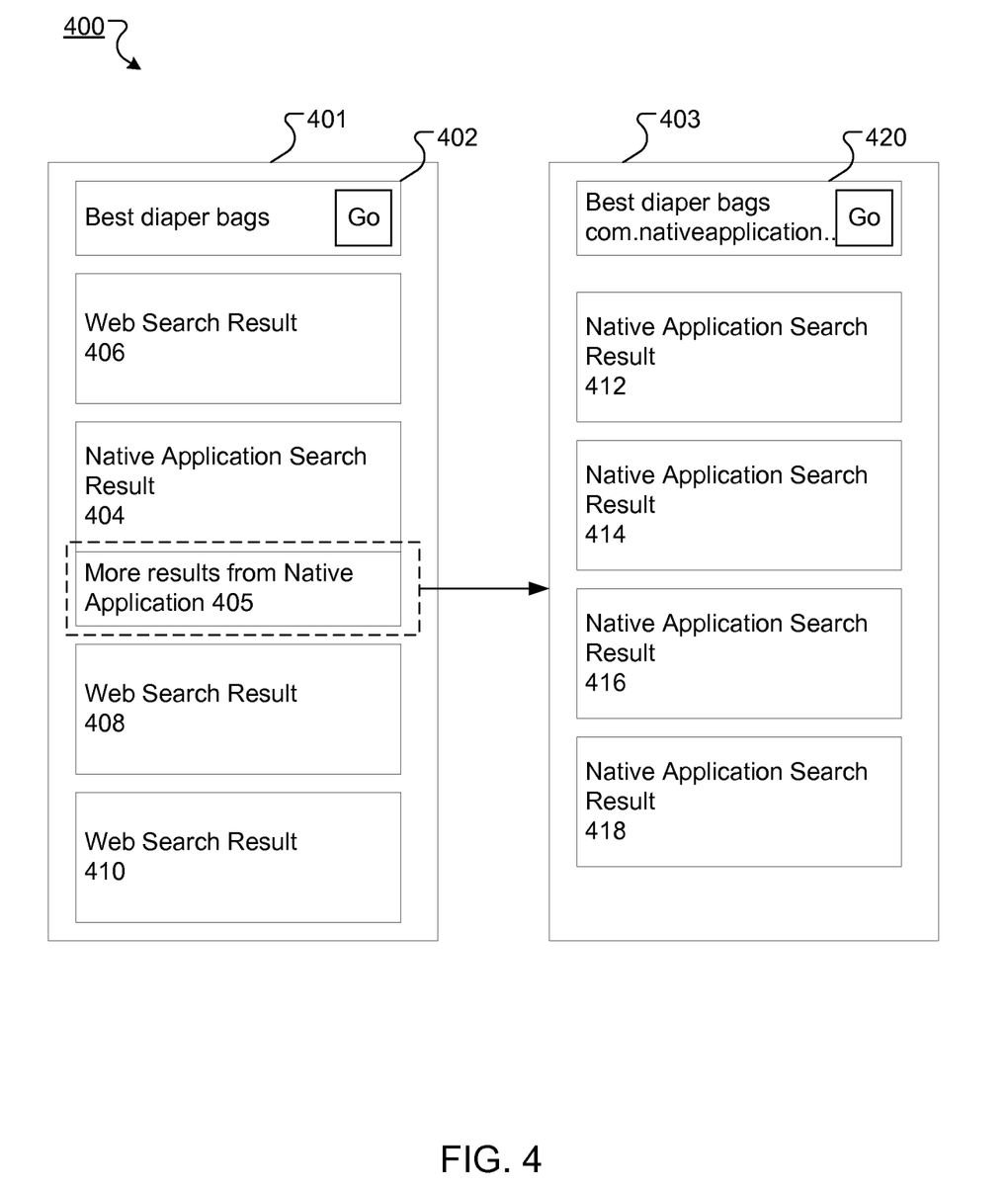
FIG. 4 is a second illustration of providing native application search results with web search results.

FIG. 4 is a second illustration 400 of providing native application search results with web search results. The search results can be provided at a browser application of a user device.

The browser application displays a view 401 of search results 404-410 provided in response to a search query 402 by a search engine. One of the search results is a native application search result, i.e., native application search result 404, while the remaining search results are web search results, i.e., web search results 406-410. The search engine can include an interface element 405.

The interface element 405 can be an additional link adjacent to the native application search result 404. The interface element 405 can display text indicating selection of the interface element 405 will cause additional relevant search results for the native application to be displayed, as described above with reference to FIG. 2.

When selected, the interface element 405 does not instantiate the native application but causes a new view 403 to be displayed in the browser application. The new view 403 displays only native application search results 412-418, each of which is a deeplink to the native application as described above.

In some implementations, the search engine modifies the search query 402 to a more specific query 420 identifying the native application. The specific query 420 limits search results responsive to the query 420 to be only native application search results for the native application and not web search results.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory computer storage medium for execution by, or to control the operation of, data processing apparatus. The computer storage medium can be a machine-readable storage device, a machine-readable storage substrate, a random or serial access memory device, or a combination of one or more of them. The computer program may include multiple files, and may be deployed to execute one or more data processing apparatus.

The term "data processing apparatus" encompasses all kinds of apparatus, devices, and machines for processing data, including by way of example a programmable processor, a computer, special-purpose circuitry, or multiple processors or computers. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output, or one or more special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, comprising:
   receiving a plurality of web search results responsive to a search query submitted at a user device, the plurality of web search results generated from a web corpus;
   including an interface element in the plurality of web search results, the interface element specifying a particular native application and configured to, when selected at the user device, cause a plurality of native application search results responsive to the search query be provided to the user device, each native application search result deeplinking to the particular native application, wherein the interface element, when selected, does not instantiate the particular native application;
   providing the interface element and the plurality of web search results to the user device;
   receiving an indication of a selection of the interface element from the user device; and
   in response to receiving the indication, providing the plurality of native application search results for the particular native application to the user device.

2. The method of claim 1, wherein including the interface element comprises:
   determining the particular native application is installed at the user device;
   retrieving the plurality of native application search results deeplinking to the particular native application that are responsive to the search query;
   determining that at least a threshold number of the plurality of native application search results have a threshold relevance score to the search query; and
   in response to determining that the threshold number have the threshold relevance score, including the interface element.

3. The method of claim 1, wherein including the interface element comprises:
   determining the particular native application is installed at the user device;
   determining that the search query has a threshold search probability ratio for the particular native application, the search probability ratio being a measure of a likelihood of the search query being submitted for an application corpus compared to the web corpus; and
   in response to determining that the search query has the threshold search probability ratio, including the interface element.

4. The method of claim 3, wherein the interface element is included as an additional link in a native application search result for the particular native application, and wherein the interface element, when selected, does not instantiate the particular native application.

5. The method of claim 1, wherein each native application search result, when selected at the user device, specifies a particular environment instance of the native application and causes the native application to instantiate an instance of the specified native application in which content referenced in the native application search result is displayed.

6. A system comprising:
   a processor; and
   computer-readable medium coupled to the processor and having instructions stored thereon, which, when executed by the processor, cause the processor to perform operations comprising:
   receiving a plurality of web search results responsive to a search query submitted at a user device, the plurality of web search results generated from a web corpus;
   including an interface element in the plurality of web search results, the interface element specifying a particular native application and configured to, when selected at the user device, cause a plurality of native application search results responsive to the search query be provided to the user device, each native application search result deeplinking to the particular native application, wherein the interface element, when selected, does not instantiate the particular native application;
   providing the interface element and the plurality of web search results to the user device;
   receiving an indication of a selection of the interface element from the user device; and
   in response to receiving the indication, providing the plurality of native application search results for the particular native application to the user device.

7. The system of claim 6, wherein including the interface element comprises:
   determining the particular native application is installed at the user device;
   retrieving the plurality of native application search results deeplinking to the particular native application that are responsive to the search query;
   determining that at least a threshold number of the plurality of native application search results have a threshold relevance score to the search query; and
   in response to determining that the threshold number have the threshold relevance score, including the interface element.

* * * * *